United States Patent
Ferraro et al.

(10) Patent No.: US 9,310,767 B2
(45) Date of Patent: Apr. 12, 2016

(54) RECONSTRUCTION OF AN IMAGE OF AN OBJECT AT LEAST PARTIALLY HIDDEN BY A FLAME

(71) Applicant: Consiglio Nazionale delle Ricerche-CNR, Rome (IT)

(72) Inventors: Pietro Ferraro, Naples (IT); Vittorio Bianco, Naples (IT); Melania Paturzo, Naples (IT); Andrea Finizio, Bacoli (IT); Lisa Miccio, Piano di Sorrento (IT); Massimiliano Locatelli, Florence (IT); Eugenio Pugliese, Florence (IT); Andrea Giovanni Geltrude, Catania (IT); Anna Pelagotti, Florence (IT); Pasquale Poggi, Verghereto (IT); Riccardo Meucci, Florence (IT)

(73) Assignee: CONSIGLIO NAZIONALE DELLE RICHERCHE-CNR, Rome (IT)

(*) Notice: Subject to any disclaimer, the term of this patent is extended or adjusted under 35 U.S.C. 154(b) by 0 days.

(21) Appl. No.: 14/100,775

(22) Filed: Dec. 9, 2013

(65) Prior Publication Data

US 2015/0160613 A1    Jun. 11, 2015

(51) Int. Cl.
*G03H 1/04*   (2006.01)
*G03H 1/00*   (2006.01)
*G03H 1/26*   (2006.01)

(52) U.S. Cl.
CPC ..... *G03H 1/0443* (2013.01); *G03H 2001/0083* (2013.01); *G03H 2001/0445* (2013.01); *G03H 2001/2655* (2013.01); *G03H 2210/63* (2013.01); *G03H 2222/16* (2013.01)

(58) Field of Classification Search
CPC .................. G02B 5/32; G02B 7/182–7/1822; G02B 7/1827–7/1828; G02F 1/01; G03H 1/00; G03H 1/08; G03H 1/0808; G03H 1/028; G03H 1/26; G03H 1/04; G03H 2001/0083; G03H 2001/0816–2001/0833; G03H 1/0443; G03H 1/0445; G03H 1/2655; G03H 2210/63; G03H 2222/16; G11B 7/0065
USPC ............. 359/1, 10, 11, 22, 26–27, 32, 33, 35, 359/223.1–226.2, 237–240, 276, 284, 286, 359/289, 350, 351, 355, 356
See application file for complete search history.

(56) References Cited

U.S. PATENT DOCUMENTS

| | | | |
|---|---|---|---|
| 6,262,818 B1* | 7/2001 | Cuche et al. | 359/9 |
| 6,266,167 B1* | 7/2001 | Klug et al. | 359/12 |
| 2008/0137933 A1* | 6/2008 | Kim | 382/131 |
| 2010/0253986 A1* | 10/2010 | Awatsuji et al. | 359/10 |
| 2012/0116703 A1* | 5/2012 | Pavillon et al. | 702/70 |

OTHER PUBLICATIONS

Bianco et al., "Clear coherent imaging in turbid microfluidics by multiple holographic acquisitions," Optics Letters, vol. 37, No. 20, pp. 4212-4214, Oct. 15, 2012.*
Locatelli et al., "Imaging live humans through smoke and flames using far-infrared digital holography," Optics Express, vol. 21, No. 5, pp. 5379-5390, Mar. 11, 2013.*
U.S. Appl. No. 14/102,748, filed Dec. 11, 2013, Ferraro, et al.

* cited by examiner

*Primary Examiner* — Stephone B Allen
*Assistant Examiner* — Adam W Booher
(74) *Attorney, Agent, or Firm* — Oblon, McClelland, Maier & Neustadt, L.L.P.

(57) ABSTRACT

Disclosed a system for reconstructing an image of an object hidden by a flame. The system comprises a laser source emitting an infrared radiation and a lensless, off-axis interferometric arrangement that divides the infrared radiation into an object beam and a reference beam. The object beam is enlarged and then irradiates the object, that scatters it. The reference beam is enlarged and then interferes with the scattered object beam, so as to create a hologram. The system comprises an infrared detector which detects the hologram and a processor that reconstructs the image of the object by numerically processing the hologram.

20 Claims, 6 Drawing Sheets

RECONSTRUCTION OF AN IMAGE OF AN OBJECT AT LEAST PARTIALLY HIDDEN BY A FLAME

FIELD OF THE INVENTION

The present invention relates to the field of systems for fire-fighting. In particular, the present invention relates to a system and method for reconstructing an image of an object (in particular, but not exclusively, a human being) at least partially hidden by a flame.

BACKGROUND OF THE INVENTION

The possibility of reconstructing images of objects (in particular, human beings) hidden by smoke and flames in fire scenes is of particular importance, especially in military and homeland security situations, in industrial sites and generally in the security field.

White-light detectors and visible wavelength sensors can not be used to this purpose, because wavelengths in the visible spectrum undergo strong scattering by smoke particles.

On the other hand, thermographic detectors employing, for example, an array of bolometers operating in an infrared wavelength region (e.g. 7-14 μm) are able to acquire images of objects hidden by smoke. Such detectors allow clear vision (in particular with laser IR illumination) through smoke, since radiation in the infrared region is scattered just slightly by smoke particles.

However, thermographic detectors are not capable of providing images of objects hidden by flames. Such detectors indeed typically comprise an objective lens which focuses radiation emitted or scattered by the object onto the thermographic detector. Such objective lens disadvantageously focuses, on at least some of the bolometers, also the infrared radiation emitted by flames and matching the numerical aperture of the lens. Such focused radiation disadvantageously may induce saturation of the bolometers and in any case hides the contribution provided by the object, so that the reconstructed image exhibits blind areas where the object is hidden by flames.

Thermal imaging cameras are also known, which are typically used for monitoring furnaces or boiler equipment used in industrial sites, so as to promptly detect possible problems and prevent their failures. These known cameras use a spectral waveband filter that only allows the detection of thermal radiation within specific wavelengths where no hot gases are emitted, e.g. around 3.80 μm.

Such thermal imaging cameras equipped with such filters can not be used to see through all kinds of flames, e.g. the flames generated during the combustion of a forest or building. In fact, solid particles of incandescent soot typically emit radiation in a continuous spectrum over a wide region extending from visible to infrared, and also at around 3.8 μm. Also such cameras then suffer from the above described saturation effect.

SUMMARY OF THE INVENTION

In view of the above, the present invention seeks to provide a system and method for reconstructing an image of an object (in particular, but not exclusively, a human being) at least partially hidden by a flame.

This is achieved by a system having the features of the independent claim. Advantageous embodiments and variants are specified in the claims dependent thereon.

According to a first aspect, the present invention provides a system for reconstructing an image of an object at least partially hidden by a flame, the system comprising:
  a laser source suitable for emitting an infrared radiation;
  an interferometric arrangement configured to divide the infrared radiation into an object beam suitable for irradiating at least a portion of the object and for being scattered by the object and a reference beam suitable for interfering with the scattered object beam so as to create a hologram of the object;
  an infrared detector suitable for detecting the hologram; and
  a processing unit configured to reconstruct the image of the object by numerically processing the hologram.

Preferably, the infrared radiation has a wavelength comprised between 3 μm and 1 mm, more preferably between 3 μm and 30 μm, even more preferably between 8 μm and 12 μm.

Preferably, the laser source is a CW laser source. The infrared radiation is preferably linearly polarized.

Preferably, the laser source has an output power higher than 10 W, more preferably higher than 20 W, even more preferably higher than 30 W.

Preferably, the interferometric arrangement is configured such that the optical power of the object beam is higher than or equal to 80% of the optical power of the infrared radiation emitted by the laser source, more preferably higher than or equal to 90% of the optical power of the infrared radiation emitted by the laser source, even more preferably higher than or equal to 99% of the optical power of the infrared radiation emitted by the laser source.

Preferably, the interferometric arrangement further comprises a first lens suitable for enlarging the object beam before it irradiates at least a portion of the object and a second lens suitable for enlarging the reference beam before it irradiates a surface of the infrared detector.

According to variants, the first lens is a cylindrical lens.

Optionally, the interferometric arrangement comprises at least one mirror suitable for deflecting the object beam before it irradiates at least a portion of the object, the at least one mirror being movable so as to enable adjusting a direction of the object beam before it irradiates at least a portion of the object.

Preferably, the interferometric arrangement further comprises an optical attenuator suitable for adjusting the optical power of the reference beam so that, on the surface of the infrared detector, the optical power of the reference beam substantially equals the optical power of the object beam scattered by the object.

Preferably, the infrared detector comprises a two-dimensional array of N×M detector elements. Hence, preferably, the processing unit is configured to acquire, from the infrared detector, the hologram in a discretized form comprising a discretized hologram array of N×M pixels.

Preferably, the processing unit is configured to:
  filter the hologram so as to cancel the zero diffraction order;
  carry out a zero-padding operation on the hologram; and
  perform a numerical focussing of the hologram.

Preferably, the processing unit is configured to perform the numerical focussing of the hologram by apply a mathematical algorithm implementing the Rayleigh-Sommerfeld formula, which provides a complex reconstructed wavefield in the form of a N×M complex matrix, wherein each element of the N×M complex matrix is a complex number.

According to preferred embodiments, the mathematical algorithm is based on a Fresnel method.

Preferably, the processing unit is configured to calculate the amplitude of the complex reconstructed wavefield by calculating the modulus of each element of the N×M complex matrix, the reconstructed image of the object being the amplitude of the complex reconstructed wavefield.

According to some embodiments, the infrared detector is configured to detect a sequence of holograms of the object.

Preferably, the processing unit is configured to numerically process each hologram of the sequence of holograms, thereby reconstructing a sequence of images of the object, and to display the sequence of images of the object in the form of a video.

Alternatively, the processing unit is configured to select K holograms from the sequence of holograms, K being an integer number equal to or higher than 2, to process each one of the K holograms thereby reconstructing K images of the object, and to combine the K images into a multi-look image of the object. In the present description and in the claims, the term "multi-look image" will designate an image obtained by combining at least two images, each one of the at least two combined images being derived by the numerical processing of a single, respective hologram.

Preferably, K is comprised between 2 and 20.

According to preferred embodiments, the processing unit is configured to select the K holograms by decimating the sequence of holograms, such decimating being carried out so that the K holograms are equispaced in time, wherein the time interval between two consecutive holograms of the K holograms is long enough to ensure that the flame induces an uncorrelation between them.

The time interval between two consecutive holograms of the decimated K holograms is longer than 0.1 seconds, more preferably longer than 0.2 seconds.

According to a second aspect, the present invention provides a method for reconstructing an image of an object at least partially hidden by a flame, the method comprising:
a) providing a coherent infrared radiation;
b) dividing the infrared radiation into an object beam and a reference beam, irradiating at least a portion of the object by means of the object beam so that the object beam is scattered by the object and inducing the reference beam to interfere with the scattered object beam on the surface of an infrared detector, so as to detect a hologram of the object; and
c) reconstructing the image of the object by numerically processing the hologram.

Preferably, in step a) the infrared radiation has a wavelength comprised between 3 µm and 1 mm.

Preferably, step b) comprises dividing the infrared radiation into object beam and reference beam such that the optical power of the object beam is higher than or equal to 80% of the optical power of the infrared radiation.

Preferably, step b) comprises enlarging the object beam before it irradiates at least a portion of the object and enlarging the reference beam before it irradiates the surface of the infrared detector.

Preferably, step b) further comprises adjusting a direction of the object beam before it irradiates at least a portion of the object.

Preferably, step b) further comprises adjusting the optical power of the reference beam so that, on the surface of the infrared detector, the optical power of the reference beam substantially equals the optical power of the object beam scattered by the object.

According to preferred embodiments, step c) comprises:
filtering the hologram so as to cancel the zero diffraction order;
carrying out a zero-padding operation on the hologram; and
performing a numerical focussing of the hologram.

Preferably, step b) comprises detecting a sequence of holograms of the object.

Preferably, step c) comprises numerically process each hologram of the sequence of holograms, thereby reconstructing a sequence of images of the object, and displaying the sequence of images of the object in the form of a video.

Preferably, step c) comprises selecting K holograms from the sequence of holograms, K being an integer number equal to or higher than 2, processing each one of the K holograms thereby reconstructing K images of the object, and combining the K images into a multi-look image of the object.

Preferably, selecting the K holograms comprises decimating the sequence of holograms, such decimating being carried out so that the K holograms are equispaced in time, wherein the time interval between two consecutive holograms of the K holograms is long enough to ensure that the flame induces an uncorrelation between them.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF EMBODIMENTS OF THE INVENTION

Figure 1:
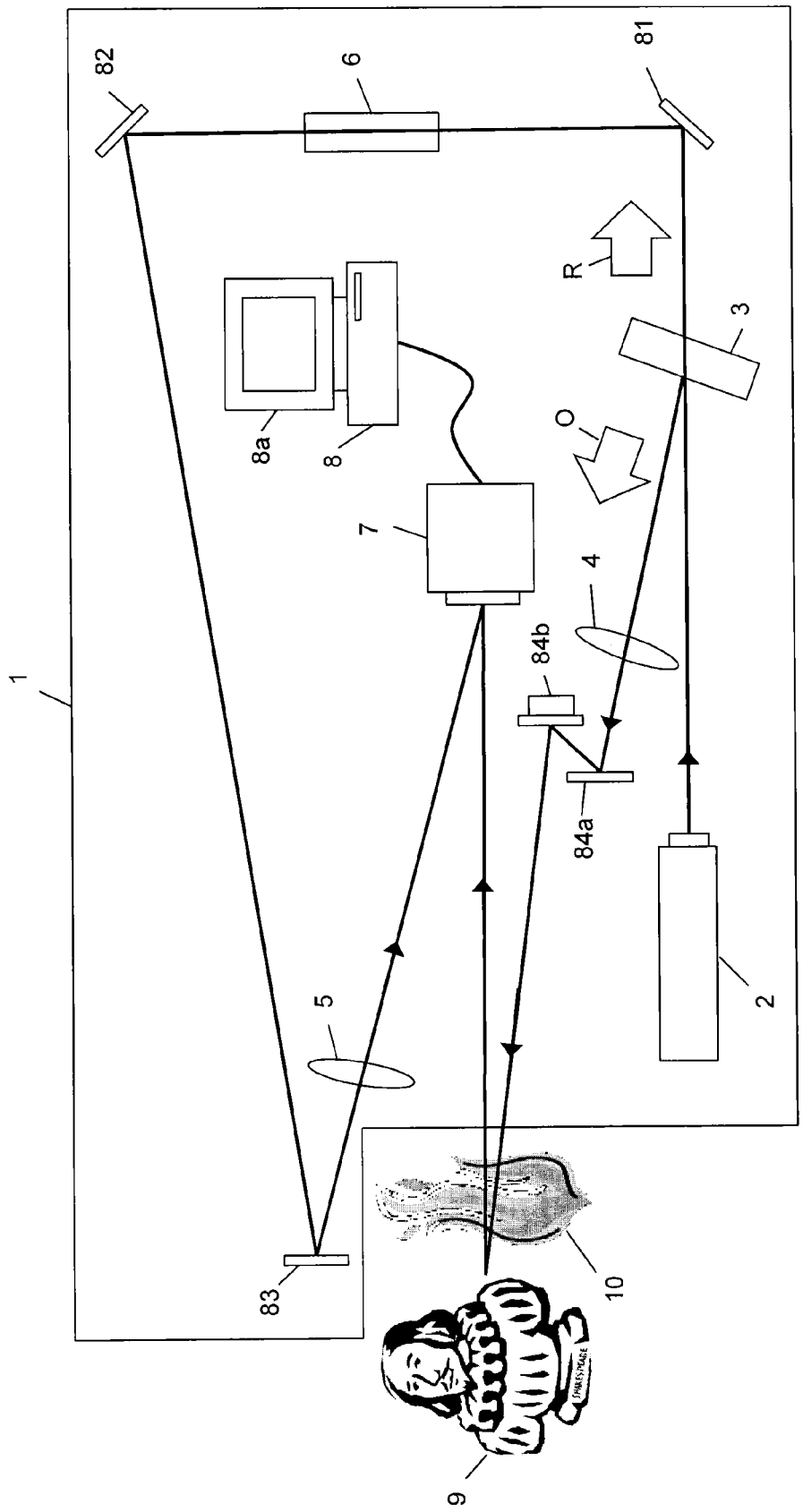
FIG. 1 schematically shows a system according to a first embodiment of the present invention.

FIG. 1 shows a system 1 for reconstructing an image of an object 9 (in particular, but not exclusively, a human being) at least partially hidden by a flame 10, according to a first embodiment of the present invention.

The system 1 preferably comprises a laser source 2, a beam splitter 3, a first lens 4, a second lens 5, a variable attenuator 6 and a infrared (IR) detector 7.

The laser source 2 is preferably suitable for emitting a radiation in the infrared region. In particular, the emission wavelength of the laser source 2 preferably is within the so-called "Mid IR region" or "long-wavelength IR region", which conventionally ranges from 3 µm to 30 µm. More preferably, the emission wavelength of the laser source 2 is comprised between 8 µm and 12 µm. The preferred range for the emission wavelength of the laser source 2 is mainly due to the following factors: range of typically available IR detectors and laser sources, atmospheric absorption spectrum in the IR region, sensitivity of the system to vibrations (which decreases as the wavelength increases) and maximum size of the object 9 (which decreases as the wavelength decreases, as it will be described in detail herein after).

The laser source 2 preferably is a CW laser source. Alternatively, a pulsed laser source may be used.

Preferably, the minimum output power of the laser source 2 is 10 W, more preferably 20 W, even more preferably 30 W. The preferred range for the output power of the laser source 2 mainly depends on the distance d between object 9 and surface of the IR detector 7 and on the object size D. Assuming to irradiate the object 9 in a substantially uniform way (and disregarding air absorption), the inventors have estimated that, if the distance d is increased by a factor n, the output power of the laser source 2 shall be increased by a factor $n^2$. The inventors have estimated that, for reconstructing the image of a human-size object 9 placed at a distance d of about 20 m from the system 1, an output power higher than 100 W (e.g. about 130 W) is required. Besides, the output power of the laser source 2 shall not exceed a threshold beyond which it may damage the surface of the object 9 (especially in case of biological tissues of a living object).

Further, the infrared radiation emitted by the laser source 2 is preferably linearly polarized. The inventors have made positive tests using a $CO_2$ laser Blade 100 manufactured by EL.EN S.p.a. (Italy), suitable for emitting a linearly polarized radiation at 10.59 μm relative to the line 10P(20) in continuous mode on the Gaussian fundamental TEM00 mode, up to a maximum power of 110 W. The minimum beam diameter of the light beam at the output of the resonant cavity was of about 10 mm and its divergence was of about 2.2 mrad.

The beam splitter 3 is suitable for dividing the infrared radiation emitted by the laser source 2 into a first light beam (also termed herein after "object beam O") and a second light beam (also termed herein after "reference beam R"). The beam splitter 3 is preferably configured such that the reference beam R and the object beam O scattered by the object 9 are received at the IR detector 7 with comparable intensities (the variable attenuator 6 is also provided to this purpose, as it will be discussed in detail herein after). Hence, the beam splitter 3 is configured such that the optical power of the object beam O is higher than 80% of the total optical power of the infrared radiation impinging on the beam splitter 3, more preferably higher than 90%, even more preferably higher than 99%. The inventors have made positive tests using a ZnSe beam splitter suitable for reflecting 80% of the input light beam and for transmitting 20% of the input light beam. In the arrangement shown in FIG. 1, the reflected part of the input radiation constitutes the object beam O, whereas the transmitted part of the input radiation constitutes the reference beam R. This is however non limiting and, in other embodiments (see FIG. 2), the object and reference beams may correspond to the transmitted and reflected parts of the input beam, respectively.

The first lens 4 is preferably arranged on the optical path of the object beam O. The first lens 4 preferably is suitable for enlarging the object beam O, as it will be discussed in detail herein after. The lens 4 may have different shapes (plane-convex, biconvex, meniscal, etc.) and it may be a convergent or divergent lens. The inventors have made positive tests using a ZnSe converging lens having a focal length L1 of 1.5 inches, which firstly focussed and then enlarged the object beam O.

The second lens 5 is preferably arranged on the optical path of the reference beam R. The second lens 5 preferably is suitable for enlarging the reference beam R, as it will be discussed in detail herein after. The lens 5 may have different shapes (plane-convex, biconvex, meniscal, etc.) and it may be a convergent or divergent lens. The inventors have made positive tests using a ZnSe converging lens having a focal length L2 of 1.5 inches, which firstly focussed and then enlarged the reference beam R.

The variable attenuator 6 is preferably arranged on the optical path of the reference beam R, more preferably between the beam splitter 3 and the second lens 5. The variable attenuator 6 is suitable for regulating the optical power of the reference beam R so as to optimize the interference pattern of reference beam R and object beam O, as it will be described in detail herein after.

The IR detector 7 is preferably arranged so as to detect the interference pattern of object beam O and reference beam R. The IR detector 7 preferably is a thermocamera comprising a 2D array of N×M detector elements (or pixels). The inventors have made positive tests using a micro-bolometric camera (640×480 array) by Thermoteknix Miricle (United Kingdom), with a frame rate of 50 frame/s, a pixel size of 25 μm×25 μm, and a spectral response in the range between 8 μm and 12 μm. According to other variants not shown in the drawings, the IR detector 7 may be a single-pixel detector, the hologram of the object 9 being detected by performing a 2D scan of the interference pattern with the IR detector 7.

The system 1 also preferably comprises one or more mirrors suitable for deflecting the optical path of the reference beam R, so as to direct the reference beam R onto the IR detector 7. In the embodiment shown in FIG. 1, by way of non limiting example, the system 1 comprises a first mirror 81 arranged between the beam splitter 3 and the variable attenuator 6. Further, preferably, the system 1 comprises a second mirror 82 and a third mirror 83 that are arranged between the variable attenuator 6 and the second lens 5.

The system 1 may also comprise other optical elements arranged on the optical path of the object beam O and/or the optical path of the reference beam R.

For instance, according to a variant not shown in the drawings, the system 1 also comprises a cylindrical lens arranged on the optical path of the object beam O. The cylindrical lens may be e.g. arranged downstream the first lens 4 along the optical path of the object beam O. The cylindrical lens provides an object beam O with an elongated shape (namely, an elliptical shape), which is particularly suitable for applications when the object 9 has an elongated shape too (which is the case for human beings).

The system 1 may also comprise one or more mirrors arranged on the optical path of the object beam O and a two-motion control device suitable for moving one of the mirrors, so as to move the object beam O in a controlled way. In particular, as shown in FIG. 1, the system 1 comprises two mirrors 84a, 84b arranged on the optical path of the object beam O. The mirrors 84a, 84b are preferably arranged downstream the lens 4. The mirror 84b is preferably provided with a two-motion control device suitable for moving it. This allows regulating the direction of the object beam O, thereby allowing to illuminate objects placed at different distances d from system 1 and, possibly, scanning the surface of the object (in particular, an elongated object) with a substantially circular object beam O, as it will be described in detail herein after. The lens 4, being positioned upstream the moving mirror 84b, advantageously does not impair the adjustability of the direction of the object beam O.

According to other variants not shown in the drawings, the system 1 may comprise other optical elements arranged on the optical path of the object beam O and/or the optical path of the reference beam R, such as for instance polarizers, Brewster windows, etc.

In any case, the beam splitter 3, the lenses 4 and 5 and the variable attenuator 6 form a lensless, off-axis interferometric arrangement, namely an interferometric arrangement wherein two interfering beams (namely, object beam O and reference beam R) are directed to the IR detector 7 without being focused on its surface (lensless) and are reciprocally tilted by a certain non-null angle as they impinge on the surface of the IR detector 7 (off-axis).

The system 1 also preferably comprises a processing unit 8 cooperating with the IR detector 7. The processing unit 8 is preferably configured to receive from the IR detector 7 the detected interference pattern in a discretised form, to store it and to process it, as it will be discussed in detail herein after. The processing unit 8 is also preferably provided with a display 8a suitable for displaying the images reconstructed from the holograms.

The system 1 may be implemented as a portable apparatus, which for instance may be mounted on a tripod located in the proximity of a fire scenario.

Figure 2:
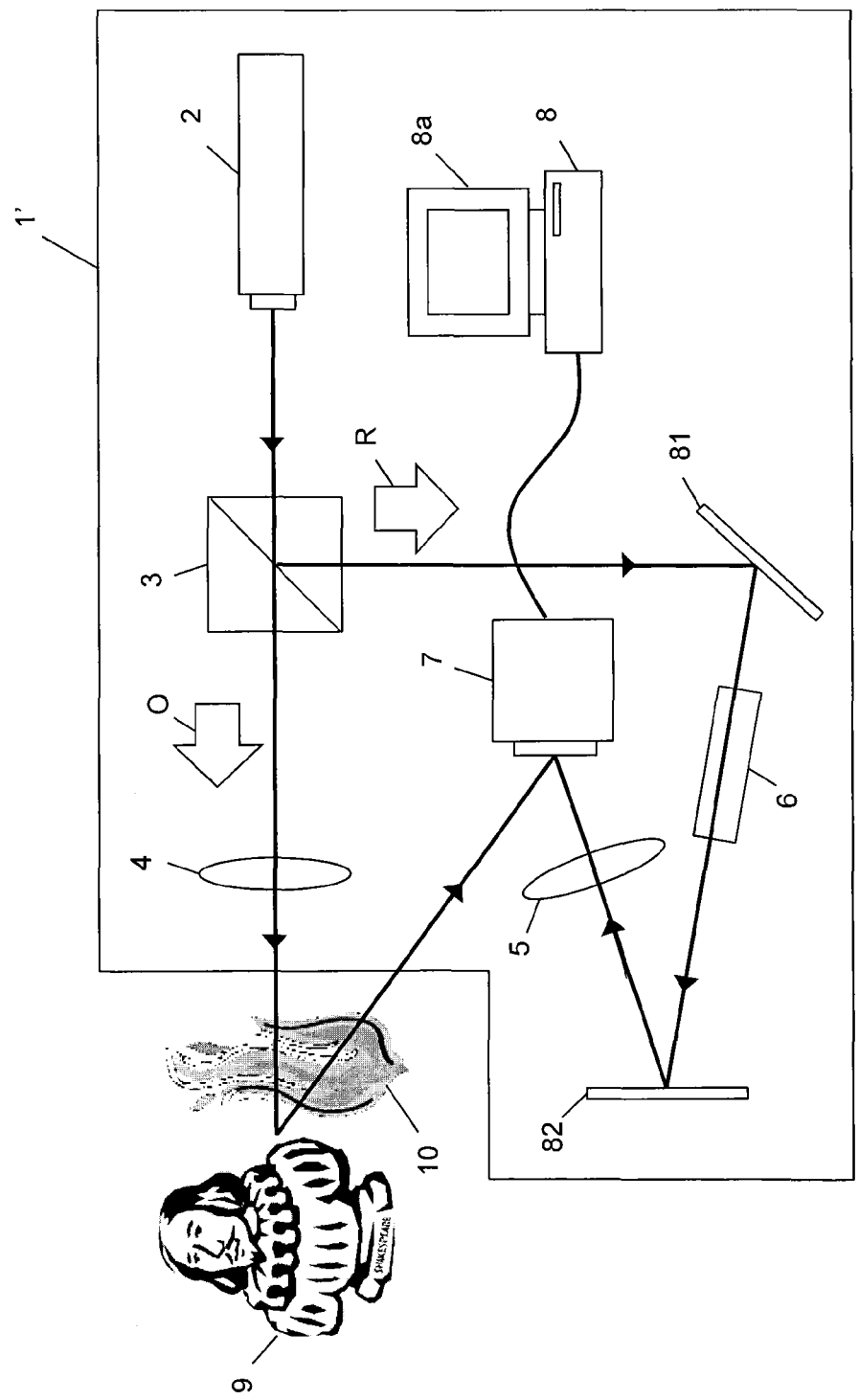
FIG. 2 schematically shows a system according to a second embodiment of the present invention.

FIG. 2 shows a system 1' according to a second embodiment of the present invention. The system 1', similarly to system 1, comprises an infrared radiation source 2 and a lensless, off-axis interferometric arrangement comprising beam splitter 3, lenses 4 and 5, variable attenuator 6 and IR detector 7. The system 1' of FIG. 2 differs from the system 1 of FIG. 1 in that:
the beam splitter 3 is arranged so that the object beam O is the transmitted part of the impinging infrared radiation, whereas the reference beam R is the reflected part of the impinging infrared radiation;
the object 9 is placed on the propagation direction of the object beam O transmitted by the beam splitter 3;
the IR detector 7 is arranged so that the normal to its sensing surface is comprised between the direction of the reference beam R impinging on this surface and the direction of the object beam O scattered by the object 9 and impinging on this surface;
it comprises a smaller number of components, namely a smaller number of mirrors. In particular, in system 1' two mirrors 81, 82 instead of three are used for deflecting the reference beam R so that it illuminates the surface of the IR detector 7.

The operation of the system 1 and the system 1' according to a first variant of the present invention will be now described with reference to the flow chart of FIG. 3.

The operation of system 1 and system 1' is preferably divided into two separate steps: an optical acquisition step 30 and a numerical processing step 31.

During the optical acquisition step 30, the system 1 or 1' is brought into proximity of the object 9 at least partially hidden by flame 10. The distance d between system 1 or 1' and object 9 depends on the environment conditions, on the extent of the flame 10, etc. Then, the laser source 2 is switched on and starts emitting an infrared radiation. The infrared radiation is divided by the beam splitter 3 into the object beam O and the reference beam R.

The object beam O is enlarged by the first lens 4, and accordingly irradiates a surface of the object 9. The extent of the irradiated surface depends on the distance d between system 1 (and, in particular, lens 4) and object 9. The object beam O is therefore scattered by the irradiated surface of the object 9, and then reaches the IR detector 7.

On the other hand, the reference beam R is reflected by the mirror 81, possibly attenuated by the variable attenuator 6 and then reflected again towards the IR detector 7. Before impinging on the IR detector 7, the reference beam R passes through the second lens 5, which enlarges it. The reference beam R accordingly reaches the IR detector 7 with a low intensity and an almost planar wavefront. The focal length and position of the lens 5 are preferably selected so that the reference beam R uniformly illuminates substantially the whole surface of the IR detector 7.

Therefore, the object beam O diffused by object 9 and the reference beam R interfere on the surface of the IR detector 7, thereby creating a 2D interference pattern or hologram of the object 9, which is detected by the IR detector 7.

The hologram exhibits interference fringes having a certain fringe spacing. The hologram may be described in terms of 2D distribution of intensity according to the following equation:

$$H(x,y)=|R|^2+|O|^2+R^*\cdot O+R\cdot O^* \quad [1]$$

where x and y are the two spatial coordinates of the surface of the IR detector 7, whereas $R^*$ and $O^*$ are the conjugate complex of the reference beam R and object beam O, respectively.

Preferably, at step 30 the variable attenuator 6 is regulated so that, on the surface of the IR detector 7, the optical power of the reference beam R substantially equals the optical power of the scattered object beam O. This results in an optimization of the visibility of the interference fringes of the hologram.

Further, preferably, in case system 1 of FIG. 1 is used, at step 30 the direction of the object beam O impinging on the object 9 is adjusted so as to illuminate a portion of the object 9 as large as possible, according to the distance d of the object 9 from the surface of the IR detector 7. To this purpose, the position of the moving mirror 84b is preferably adjusted.

Since, thanks to the use of a long infrared wavelength, the systems 1 and 1' exhibit low sensitivity to vibrations, no anti-vibrations measures are needed at step 30. Furthermore, since the IR detector 7 is only sensitive to infrared radiations, the component of the artificial light or sunlight in the visible range do not disrupt operation of the systems 1 and 1' during step 30. Besides, the infrared component of the artificial light or sunlight does not impair the operation of systems 1 and 1', because it is incoherent with object beam O and reference beam R, and accordingly merely represents a background noise.

The interference pattern or hologram acquired by the IR detector 7 (or, rather, its discretized version) is then stored by the processing unit 8. A single hologram of the object 9 may be acquired and stored. Alternatively, multiple consecutive holograms of the object 9 may be acquired and stored, e.g. in a form of a video if a dynamic scene is of interest.

Then, the processing unit 8 carries out the numerical processing step 31 onto the discretized hologram.

During a first sub-step 310, the hologram is preferably filtered, so as to cancel the DC term or zero$^{th}$ diffraction order, namely the term $|R|^2+|O|^2$ of equation [1]. Since the systems 1 and 1' have an off-axis configuration (namely the reference beam R and object O impinge on the IR detector 7 with different angles), such DC term $|R|^2+|O|^2$ is advantageously spatially non superimposed to the other terms $R^*\cdot O+R\cdot O^*$, and accordingly may be filtered out in the spatial frequency domain.

Then, during a second sub-step 311, a zero padding operation is preferably applied to the hologram, namely the array of N×M pixels of the filtered, discretized hologram is extended by introducing a number of additional fictitious pixels, the intensity of which is set to zero. Preferably, the zero padding operation is that described in EP 1 654 596, in the name of the same Applicant.

In fact, as known in digital holography, for reconstructing an image of an object starting from the acquired hologram, a mathematical algorithm derived from the diffraction theory is executed, in particular a mathematical algorithm implementing the known Rayleigh-Sommerfeld formula. Such formula basically contains a double integration of the digitalized hologram multiplied by a numerical copy of the reference beam R and other terms. Such double integration, in principle, involves considerable calculating effort. However, its numerical implementation may be simplified by converting the integrals in Fourier transforms. Indeed, since the hologram is discretized, the Fourier transforms actually are discrete Fourier transforms, which may be easily calculated by means of known FFT (Fast Fourier Transform) algorithms. To operate the transformation, in particular, two methods are known: the convolution method and the Fresnel method. The Fresnel method is advantageous over the convolution method, in that it involves one single Discrete Fourier Transform (DFT) which can be easily implemented by means of the FFT algorithm. The spatial resolution of the reconstructed image is quantified by the so-called "reconstruction pixel", whose sizes along the directions x and y are given by the following equations:

$$\Delta\xi = \frac{\lambda \cdot d}{N \cdot \Delta x} \quad [2]$$
$$\Delta\eta = \frac{\lambda \cdot d}{M \cdot \Delta y}$$

where N and M are the number of pixels of the acquired discretized hologram along the directions x and y, $\lambda$ is the emission wavelength of the laser source 2, d is the reconstruction distance (namely, the distance between object 9 and IR detector 7 and $\Delta x$ and $\Delta y$ are the pixel sizes of the IR detector 7 along the directions x and y. From the above equation [2], it is apparent that $\Delta\xi$ and $\Delta\eta$ are proportional to the wavelength $\lambda$ and the reconstruction distance d, whereas they decrease with the number of pixels N×M and the pixel physical size. Consequently, spatial resolution of the reconstructed image may be worst than the physical one imposed by the sampling theorem, depending on the values of the parameters of equations [2].

The zero padding operations mentioned above advantageously allows enhancing the spatial resolution of the reconstructed image. More specifically, by adding fictitious pixels with null intensity to the N×M array of the acquired hologram, $\Delta\xi$ and $\Delta\eta$ are reduced and the spatial resolution is increased. Preferably, the fictitious pixels are added as contour of the acquired hologram, that is without interleaving them among the effective pixels. This assures that no spurious frequencies arise in the reconstructed image as a consequence of the discontinuities that such interleaving would introduce. The number of fictitious pixels depends on the desired resolution in the reconstruction of the image. The maximum resolution which may be obtained is equal to the physical boundary established by the sampling theorem.

Although the advantages of the zero padding operation have been discussed above with reference to the Fresnel method only (where zero padding basically allows compensating the resolution reduction entailed by use of a longer wavelength, see above equations [2]), the zero padding operation may be used in combination with other methods, such as angular spectrum method or convolution method.

Then, at a third sub-step 312, the acquired discretized hologram (filtered at sub-step 310 and possibly "enlarged" at sub-step 311) is processed for reconstructing an image of the object 9.

Such sub-step 312 in particular comprises applying to the acquired discretized hologram (filtered and possibly "enlarged") a mathematical algorithm implementing the above mentioned known Rayleigh-Sommerfeld formula which basically emulates the diffraction effects of the propagation of a numerical copy of the reference beam R across the hologram and gives, as a result, the object wavefront reconstruction, focussed at the distance d. Preferably, the algorithm is based on the above mentioned Fresnel method, which is particularly easy and fast in comparison to other known methods. However, according to other variants, other numerical focusing methods can be used, for instance the angular spectrum method or the convolution method.

The execution of the numerical focussing of sub-step 312 provides a complex reconstructed wavefield, namely a matrix wherein each element or pixel of the matrix is a complex number. Sub-step 312 preferably further comprises calculating the amplitude of the complex reconstructed wavefield by calculating the amplitude of each pixel of the matrix separately, namely by calculating the modulus of each complex number of the matrix. The resulting matrix is the amplitude of the complex reconstructed wavefield, namely the reconstructed image of the object 9.

Sub-step 312 also preferably comprises filtering the complex conjugate of the complex reconstructed wavefield, which is provided by the numerical focussing of the hologram.

Further, sub-step 312 may comprise other numerical processing operations on the hologram and/or the complex reconstructed wavefield, e.g. for improving the signal-to-noise ratio of the reconstructed image.

The reconstructed image is then preferably displayed on the display 8a of the processing unit 8 (step 32).

Therefore, the systems 1 and 1' are capable of providing images of objects based on an interferometric technique, namely digital holography, at long infrared wavelengths. This has a number of advantages.

First of all, differently from known visible and thermographic acquisition technique, even if large portions of the object or even all of the object 9 is hidden by the flame 10, the system 1, 1' allows to see through the flame 10 thereby providing an image with no blind zones, without significant resolution loss. This is due to some intrinsic features of digital holography.

Firstly, since the system 1, 1' does not comprise any lens which focuses the radiation impinging on the IR detector 7, the infrared radiation emitted by the flame 10 is not focused on the IR detector 7, but is distributed over its whole surface. Hence, no image of the flame 10 is formed on the surface of the IR detector 7 and, consequently, no pixel saturation is induced. In other words, the IR detector 7 acquires the image of the object 9 out-of-focus, and accordingly the saturation effect which is observed in the known thermographic acquisition technique is avoided and the IR detector 7 is not blinded by the flame emission.

Besides, the infrared radiation emitted by the flame 10 is incoherent with reference beam R and object beam O and accordingly does not take part to the formation of the interference fringes of the hologram. The infrared radiation emitted by the flame 10 accordingly is only a background noise, which is distributed on the whole surface of the IR detector 7.

Furthermore, thanks to the ability of holography to reconstruct entirely an image of the object wavefront from a smaller portion of the hologram, system 1, 1' allows reconstruction of the whole image even if some pixels are accidentally saturated or if some micro-particles, often present in fire scenarios, obstruct direct imaging.

For all such reasons, the systems 1 and 1' advantageously allow reconstructing the image of the object 9 behind the flame 10.

The systems 1 and 1' have further advantages.

First of all, thanks to the use of a long IR wavelength, it is possible to reconstruct images of human-size objects, as it will be discussed in detail herein after.

Furthermore, laser sources suitable for emitting long IR wavelengths (e.g. high power $CO_2$ lasers) are broadly available with good spatial and temporal coherence properties, so it is possible to expand the object beam O to view very large scenes and to obtain high visibility interference fringes even with a very high object and reference beam paths imbalance.

The systems 1 and 1' therefore allow providing real-time reconstructed images of live, moving people in fire scenes, e.g. with people trapped in an apartment invaded by flames, where naked-eye vision is completely impaired. In this case, a thermographic camera would not be able to return a view of the people inside the apartment, because of flame emissions. The systems 1 and 1', based on digital holography, are instead capable of discarding the flame contributions and offer a clear view of any people behind them.

Clear images are advantageously obtained, independently of the chemical nature of the burning materials involved and from their emission spectrum. Therefore, the described systems 1 and 1' can be advantageously used for reconstructing images of objects at least partially hidden by any kind of flames.

The operation of the systems 1 and 1' according to a second variant will be now described with reference to the flow chart of FIG. 4.

According to the second variant, the system 1, 1' carries out a speckle noise reduction operation.

The systems 1 and 1' are indeed imaging systems employing a coherent laser source and, as such, their performance is degraded by coherent noise and, especially, correlated speckle noise. As known, speckle noise is a multiplicative noise that occurs when a coherent light hits targets whose roughness varies on the same scale of the light wavelength. In this case, each detector element of the IR detector 7 detects the coherent superposition of a number of different scattering contributions. As the scattering contributions experience microscopically different paths, their phases can be variable and the result of their coherent superposition at the IR detector 7 is a succession of dark and bright spots, known as "speckle noise". As a result, the quality of the image reconstructed from the acquired hologram decreases in terms of contrast and pixel resolution.

As known, speckle noise may be quantified using a statistical approach. In particular, a known way to obtain indications about the speckle noise extent is to measure the speckle contrast C as follows:

$$C = \frac{\sigma}{\mu} \quad [3]$$

where $\sigma$ and $\mu$ denote the standard deviation and the mean amplitude of the image, respectively. Furthermore, a punctual measure of the intensity variations due to speckle noise may be obtained by calculating the relative deviation of the image as:

$$R_{DEV}(x, y) = \frac{I(x, y) - \bar{I}}{\bar{I}} \quad [4]$$

where I(x,y) is intensity of the pixel of the reconstructed image and $\bar{I}$ a mean intensity calculated over the whole image. In particular, if a portion of a homogeneous part of the image is chosen, smooth behaviour of its intensity should be expected. So, any rapid variations and sudden spikes in its intensity have to be attributed to speckle in those points where interference has been strongly destructive or constructive.

Figure 4:
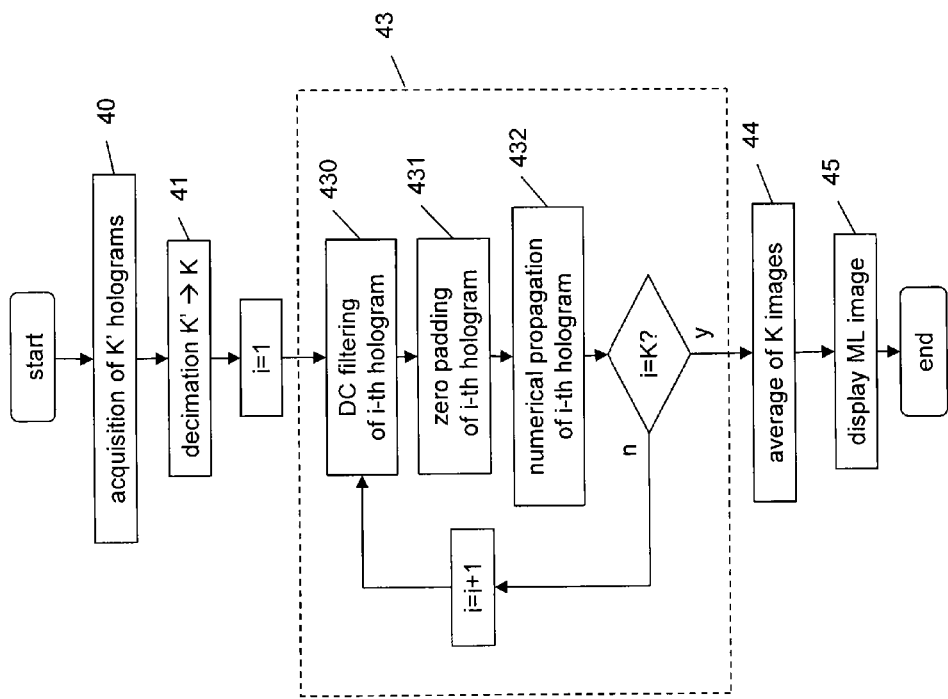
FIG. 4 is a flow chart relating to the operation of the systems of FIGS. 1 and 2, according to a second variant of the present invention.

In order to reduce the speckle contrast, according to the second variant shown in FIG. 4, several holograms (in particular, K' holograms) of the object 9 are preferably acquired by the IR detector 7 at different times (step 40).

Then, optionally, the K' holograms may be decimated for extracting K<K' holograms (step 41). K is preferably comprised between 2 and 20, more preferably between 3 and 10. For instance, the K holograms may be obtained by selecting a hologram every Q holograms acquired by the IR detector 7. This provides K holograms whose acquisition times are substantially equispaced in time. The inter-acquisition time of the K holograms (namely, the time interval between two consecutive holograms of the decimated sequence of K holograms) depends both on the frame rate of the IR detector 7 and Q. Given a certain frame rate of the IR detector 7, Q is preferably selected so that the inter-acquisition time of the selected K holograms is long enough to ensure a certain uncorrelation between them. For instance, with a frame rate of 50 frames/seconds, the K holograms may be obtained by selecting one hologram every Q=10 acquired holograms. This provides an inter-acquisition time of about 0.2 seconds, which is long enough for vision through flames (flames introduce a uncorrelation faster than smoke, which would require a longer inter-acquisition time). On the other hand, the inter-acquisition time of the K holograms shall be low enough to ensure that, during acquisition of the K holograms, the object 9 is substantially still.

Decimation allows an in-line selection of the K holograms, namely the hologram selection is performed while the K' holograms are acquired. Alternatively, at step 41 the K holograms may be selected off-line, namely after the acquisition of the K' holograms is completed. According to such embodiments, the selection of the K holograms may be carried out e.g. by optimizing a metric indicative of the image quality, e.g. of its signal-to-noise ratio.

Figure 3:
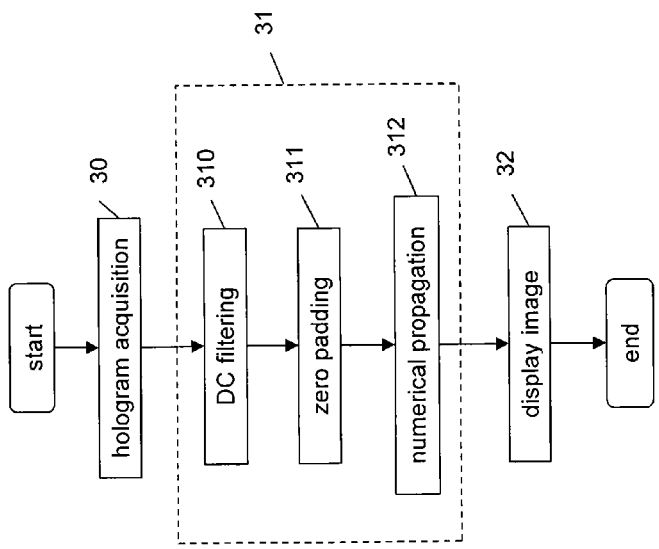
FIG. 3 is a flow chart relating to the operation of the systems of FIGS. 1 and 2, according to a first variant of the present invention.

Then, each one of the K holograms is preferably subjected to a numerical processing step 43 similar to the numerical processing step 31 of FIG. 3. In particular, the numerical processing step 43 comprises, for each hologram, a DC filtering sub-step 430, a zero padding sub-step 431 and a numerical propagation sub-step 432. For a detail description of such sub-steps, reference is made to the above description of the flow chart of FIG. 3. As a result, an image is preferably reconstructed from each one of the K holograms. As mentioned above, each image in particular is obtained by calculating the amplitude (or modulus) of each pixel of the complex reconstructed wavefield matrix resulting from the numerical focussing carried out at sub-step 432.

Then, an average of the K images is calculated (step 44), which provides a multi-look (ML) image. The average in particular is calculated by carrying out an incoherent, pixel-by-pixel sum of the amplitude matrixes derived from the K holograms, divided by K.

The multi-look image is then displayed by the display 8a (step 45).

The speckle contrast C of the multi-look image may be advantageously reduced by a factor up to $\sqrt{K}$ in comparison to the speckle contrast of each single image. It is indeed known that the sum of K uncorrelated random variables having a same mean $\mu_{Xi}$ and a same variance $\sigma_{Xi}$ has a variance equal to the variance $\sigma_{Xi}$ of the single variable divided by $\sqrt{K}$. From equation [3] above it is therefore directly derived that the speckle contrast $C_{\tilde{X}}$ of the multi-look image resulting from step 44 is:

$$C_{\tilde{X}} = \frac{1}{\sqrt{K}} \frac{\sigma_{Xi}}{\mu_{Xi}} = \frac{1}{\sqrt{K}} C_{Xi} \quad [5]$$

where $C_{Xi}$ is the speckle contrast of each single image. Hence, the averaging operation carried out at step 44 would reduce the speckle contrast by a factor $\sqrt{K}$, if the K images were totally uncorrelated. However, since (in spite of the uncorrelation introduced by the flame) a certain correlation degree still exists between the K images, the actual speckle contrast improvement is smaller, as it will be shown by a test described herein after.

Figure 5:
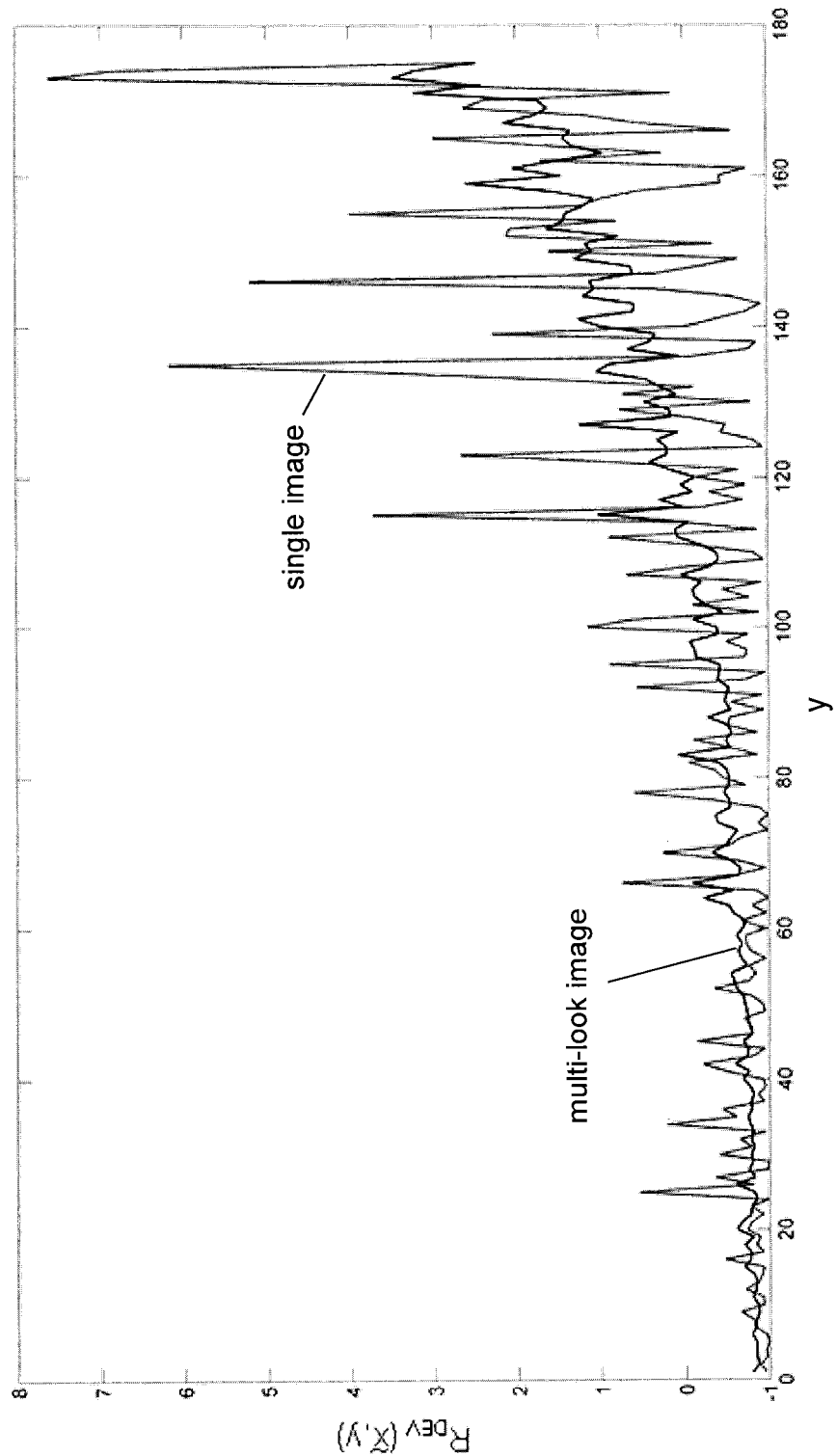
FIG. 5 shows numerical results of a test performed by the inventors.
Figure 6:
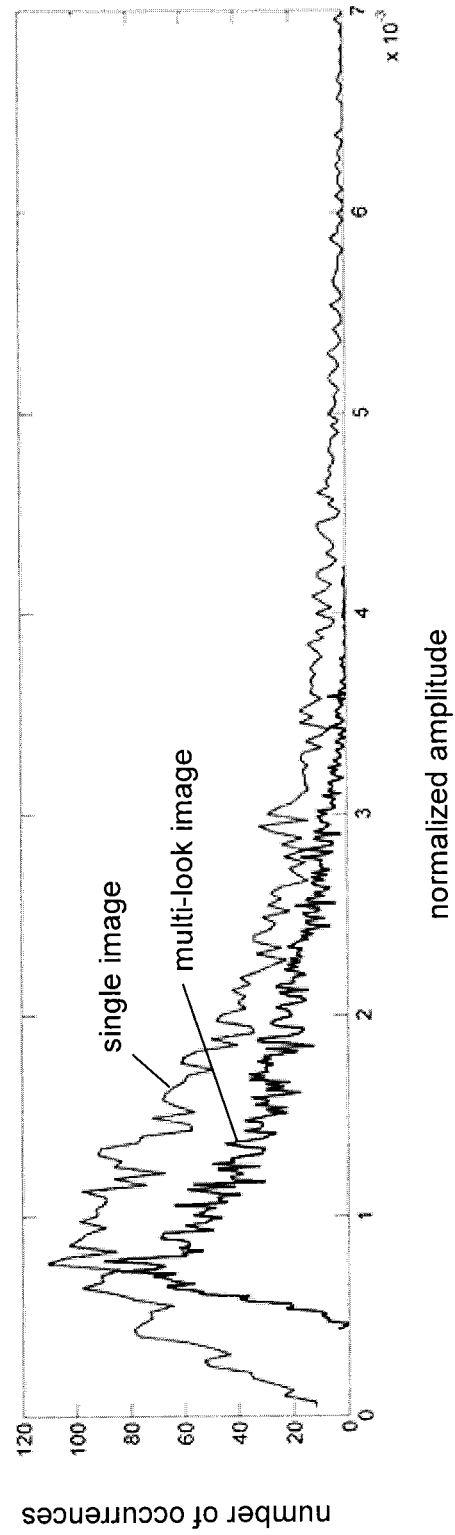
FIG. 6 shows numerical results of a test performed by the inventors.

FIGS. 5 and 6 show numerical results of a test carried out by the inventors for testing the speckle contrast reduction brought about by step 44.

A bronze statuette was placed into a Plexiglass™ box filled with smoke. A sequence of holograms were then acquired by a system similar to the system 1 of FIG. 1, after the smoke filled the box. The acquired holograms were then suitably decimated (one every 10 acquired holograms), in order to obtain a subset of K=25 holograms. Each hologram was subjected to sub-steps 430, 431 and 432 of the flow chart of FIG. 4, thereby obtaining an image from each hologram. The images have then be averaged for obtaining a multi-look image. The speckle contrast has then be measured, both on the single images and the multi-look image.

FIG. 5 shows the relative deviation $R_{DEV}(\tilde{x},y)$ calculated along a homogeneous linear test area parallel to the direction y, both for one of the single images and for the multi-look image. As expected, in the single image the speckle noise is responsible for rapid fluctuations of the relative deviation $R_{DEV}(\tilde{x},y)$. Besides, as expected, the relative deviation $R_{DEV}(\tilde{x},y)$ exhibits a much smoother behaviour in the same test area of the multi-look image. This suggests that a significant gain has been achieved in reducing the speckle noise by combining multiple images.

This was confirmed also by the measurement of the speckle contrast C, which in the multi-look image was decreased 12% with respect to the single image. The inventors noticed that, since—in spite of the flames—a residual correlation between the employed holograms was still present, the measured improvement factor 12% was smaller that the maximum theoretical improvement factor, i.e. 20% in the case of K=25 (see above equation [5], applicable in case of completely uncorrelated images).

As further validation, amplitude histograms were calculated in a homogeneous test area of both the single reconstructed image and the multi-look reconstructed image. The results are shown in FIG. 6. In particular, the graph of FIG. 6 shows the number of occurrences for each normalized amplitude value, namely the number of times pixels of the homogeneous test area exhibited that normalized amplitude value. Since the test was carried out on a homogeneous area, a lower variance is indicative of fewer random variations of amplitude caused by speckle noise (ideally, if no speckle noise were present, the histogram would exhibit zero occurrences for all the normalized amplitude values except one). As expected, FIG. 6 shows that a smaller variance is obtained in the multi-look reconstructed image.

The inventors have carried out some tests for assessing the capabilities of the system to reconstruct images through flames, in particular for evaluating its performance in comparison to known thermographic acquisition.

A first test was aimed at testing the performance of the system in case of an object partially or completely hidden by flames.

Objects of different sizes (up to human size) were hidden by a curtain of flames. The flames were obtained using candles or portable mini stoves, so that large portions of the objects or the whole objects were covered by the flames. Then, for each object, a holographic image reconstruction was made using a system similar to the system 1 of FIG. 1 described above. Further, for each object, also a thermographic acquisition and a white light acquisition were made for comparative purposes.

In the thermographic acquisition set up and in the white light acquisition set up, a lens was used for focussing radiation diffused by the objects on the detector. As expected, in both cases also the whole flame emission was collected and focused by the lens on some elements of the detector, causing saturation and resulting in blind areas of the images.

On the contrary, the holographic image reconstruction did not exhibit any blind area, even where the objects were covered by flames. This, as mentioned above, is due to the fact that the system has a lensless configuration, and accordingly no image of the flames was focussed on the IR detector. The infrared radiation emitted by the flames was then distributed over the whole surface of the IR detector, thereby avoiding saturation and, besides, since it is not coherent with the laser radiation, it does not disturb the interferometric pattern at all. Moreover, as known from the holography theory, each part of an hologram contains information coming from the whole object, which can be used to reconstruct the entire image. Similarly, a small subset of sparse hologram pixels may be used. Therefore, even if some of the pixels of the IR detector 7 are saturated, the corresponding information can be recovered from those pixels that have not been affected by saturation. For the same reason, digital holography allowed the vision of objects even if some macro particles, often present in real fire scenarios, obstructed their direct imaging. In this way, digital holography was able to provide images of the whole objects with no blind areas.

A second test was then carried out, for testing the capability of the system to provide images of objects with size comparable to that of human beings.

Figure 7:
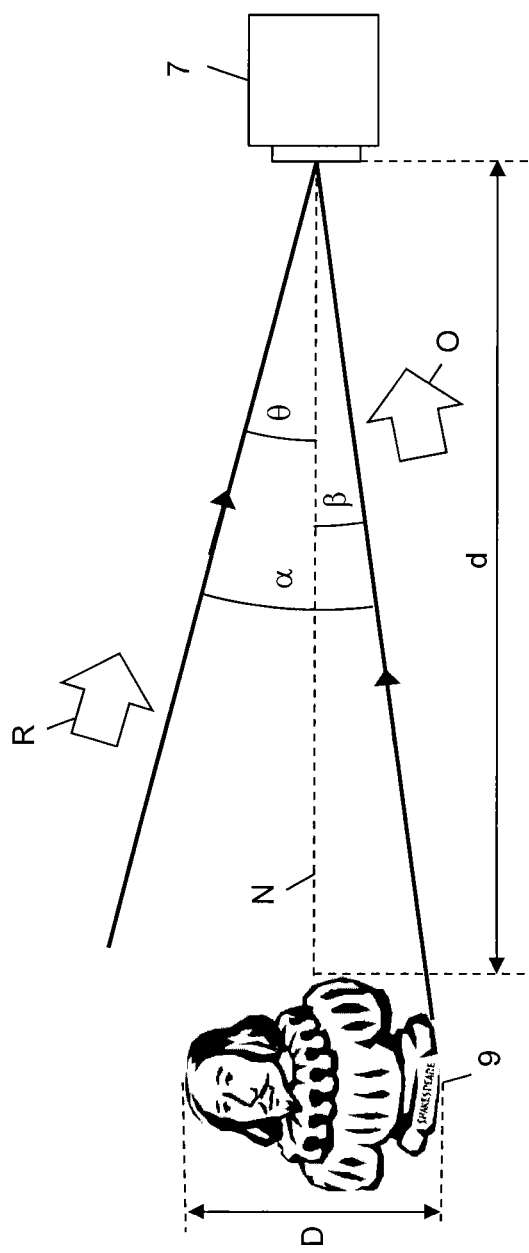
FIG. 7 schematically shows a portion of the system of FIG. 1.

It is known that the object 9 illuminated by the object beam O scatters light in different directions. In particular, the contributions of the object beam O scattered by the various points of the surface of the object 9 and impinging on the surface of the IR detector 7 form different angles α with the reference beam R. The angle α is equal to θ+β, wherein θ is the angle between reference beam R and normal N to the surface of the IR sensor 7, while β is the angle between scattered object beam O and normal N to the surface of the IR sensor 7 (see FIG. 7). The larger the object size, the wider is the range of the angles α which the scattered object beam O forms with the reference beam R. As the angle α increases, however, the fringe spacing of the hologram decreases. In particular, as known, the fringe spacing P of the hologram depends on the angle α according to the following equation:

$$P = \frac{\lambda}{2\sin(\alpha/2)} \quad [6]$$

where $\lambda$ is the wavelength. Equation [6] applies under the assumption that $\theta$ is substantially equal to $\beta$. In order to satisfy the Whittaker-Shannon sampling theorem, $P \geq 2d_P$ where $d_P$ is the size of a single pixel of the IR detector 7. Hence, the maximum value of the angle $\alpha$ which allows detecting the hologram fringes is:

$$\alpha_{max} = 2\sin^{-1}\left(\frac{\lambda}{4d_P}\right) \approx \frac{\lambda}{2d_P}, \quad [7]$$

the last equality applying in case of small angles.

On the other hand, the maximum angle $\beta_{max}$ formed by the object beam O scattered by the surface of the object 9 and the normal to the surface of the IR detector 7 depends both on the distance d between object 9 and surface of the IR detector 7 and on the object size D according to the following equation:

$$\beta_{max} = \arctan(D/2d) \approx D/2d \quad [8]$$

the last equality applying in case of small angles. Equation [8] applies under the assumption that D is much larger than the size of the IR detector surface.

Hence, starting from the above equations [7] and [8], it is possible to calculate the maximum value of the angle $\theta$ between the reference beam R and normal N to the surface of the IR sensor 7:

$$\theta_{max} = \alpha_{max} - \beta_{max} = \lambda/(2d_p) - D/2d \quad [8a]$$

For a certain distance d, it is however possible to decrease the angle $\theta$ in order to make it possible to detect the hologram of an object 9 with larger dimension (since $\alpha_{max}$ is fixed by the sampling theorem, decreasing $\theta$ allows to increase $\beta_{max}$ and, consequently, the object size D). In order to respect the diffraction orders separation condition, however, it is not possible to decrease $\theta$ indefinitely, since it must be at least equal to D/2d. Inserting this value in equation [8a] provides therefore the maximum object lateral size $D_{max}$:

$$D_{max} = \lambda d/(2d_P) \quad [9]$$

From equation [9], it is apparent that:
a longer wavelength allows reconstructing images of larger objects, $D_{max}$ being proportional to $\lambda$;
a smaller pixel size allows reconstructing images of larger objects, $D_{max}$ being inversely proportional to $d_P$; and
images of larger objects may be reconstructed by placing the objects at longer distances from the system, $D_{max}$ being proportional to d.

Considering that an IR wavelength $\lambda$ may be about 20 times a visible wavelength (10 μm instead of 0.5 μm) and that the pixel size $d_P$ of a IR detector is typically about 5 times that of a visible photodetector (25 μm instead of 5 μm), from equation [9] it is derived that, for a certain distance d, use of an infrared setup allows reconstructing images of objects about four times larger than those which would be provided by a setup using visible radiation.

For this reason, reconstructing an image of a human-size object with digital holography would be not possible using a laser radiation with wavelength e.g. in the visible range. For instance, digital holography with an exemplary visible wavelength of 532 nm at a reconstruction distance d=2 m using typical visible detectors pixel size $d_P$=5 μm would allow reconstructing images of objects with a maximum size of about 10 cm. Using a long infrared wavelength (e.g. of about 10 microns) with the same reconstruction distance d=2 m and the pixel size $d_P$=25 μm instead allows increasing the maximum object size to about 40 cm.

In the second test carried out by the inventors, a plastic mannequin 190 cm tall and with a lateral dimension of about 60 cm was used as object and was placed at a reconstruction distance d=300 cm from the IR detector 7 of a system similar to the system 1 of FIG. 1. As explained above, in the system 1 the object beam O is enlarged by the first lens 4 before impinging on the object 9. The dimension of the object beam O is accordingly limited by the focusing power of the lens 4. Therefore, only a portion of the object 9 might be irradiated, which may be smaller than the theoretical maximum image size allowed by use of a long infrared wavelength as explained above.

For irradiating a larger portion of the human-size object, as mentioned above, the system may be provided with a cylindrical lens arranged on the optical path of the object beam O, before it impinges on the object. This allows providing the object beam O with an elliptical shape, which better matches the elongated shape of a human being.

Alternatively, as shown in FIG. 1, a moving mirror 84b may be provided on the optical path of the object beam O, allowing to perform a scanning of the elongated object with the object beam O. In the second test, the inventors have implemented such second technique. The scanning process of the plastic mannequin took 30 seconds. Shorter scanning times could be achieved, but this would reduce the reconstruction resolution. Such reduction could be at least in part compensated by increasing the frame rate and decreasing the exposure time. During the scanning process, a sequence of holograms was acquired. Then, the holograms were suitably decimated (e.g. by selecting only holograms relating to non-overlapping, contiguous portions of the object) and, for the selected holograms, the corresponding images were reconstructed and then superimposed for providing a single image of the whole object. The test provided positive results, namely it provided a clear image of the whole human size object.

Alternatively, instead of superimposing the images before they are displayed to the user, the images obtained from the decimated holograms may be displayed on the display 8a in a rapid sequence, thereby providing a video of the scanning. Alternatively, no decimation is carried out and all the acquired holograms are processed for reconstructing corresponding images, which are then displayed as a video, thereby providing a slow scan of the object.

A third test was then carried out, for testing the capability of reconstructing images of a human being partially hidden by flames, in particular of a man standing behind a flame. Flames were generated by portable mini stoves.

Besides digital holography image reconstruction, also a thermographic image acquisition and a white-light image acquisition were performed, for comparative purposes.

As expected, the thermographic acquisition provided an image where flame emission completely occluded the man's body and his face. As a consequence, only arms and hands of the man were visible, as they extended over the flames. Similarly, also white-light acquisition provided an image where the flame emission blinded the detector.

The digital holography reconstruction made with system 1 instead provided an image of the man where also details hidden by flames (in particular, his face) were clearly visible, despite the flames in the line of sight of the IR detector 7. The image was a multi-look image obtained by applying the speckle noise reduction according to the flow chart of FIG. 4. As described above, such operation provides for acquiring a set of uncorrelated (or weakly correlated) holograms and averaging them to provide the multi-look image, which exhibits an improved speckle contrast. In case the line of sight between the object and the IR detector 7 is impaired by the presence of a flame whose emission tends to saturate some of the pixels of the IR detector 7, the moving flame itself provides a temporal diversity, as the spatial changes of the refractive index due to the flame are time variant as well. In the single images provided by such fourth test, the effect of the speckle noise was apparent, with dark areas hindering a clear vision of the human being behind the flames. In the multi-look image, instead, the missing information was correctly restored and more details could be appreciated.

Therefore, the system 1, 1' implements an infrared, lensless digital holography image reconstruction technique which allows to reconstruct images of objects at least partially hidden by flames, irrespective of the type of flame. The capability of reconstructing images of human-size objects enables application of the system to a wide set of real fire scenes. This advantage is obtained because system 1, 1' is an interferometric lensless system and therefore:

flames radiation does not disturb the interferometric pattern containing the desired information, because it is not coherent with laser radiation; and flames radiation does not saturate the IR detector 7 because no optical system is used to create the image upon the IR detector surface that is therefore not blinded by flame emission, which is the main impediment for thermographic imaging.

A further advantage of the system of the invention is that, through a numerical processing of the acquired holograms, it is possible to improve a posteriori the image quality, both in terms of resolution and in terms of speckle noise.

Moreover, focussing objects at different depths starting from a same hologram is advantageously possible.

Although each one of the above described systems comprises an amplitude division interferometric arrangement, this is not limiting. Indeed, according to other embodiments not shown in the drawings, the system may comprise an interferometric arrangement of any other known type, for instance a wavefront division interferometric arrangement.

The invention claimed is:

1. A system comprising:
a laser source configured to emit infrared radiation having a wavelength between 3 μm and 1 mm;
an interferometric arrangement configured to divide said infrared radiation into an object beam to irradiate at least a portion of an object at least partially hidden by a flame and to be scattered by said object and a reference beam that interferes with said scattered object beam to create a hologram of said object;
an infrared detector configured to detect said hologram; and
a processor configured to reconstruct an image of said object at least partially hidden by the flame by numerically processing said hologram.

2. The system according to claim 1, wherein said interferometric arrangement further comprises a first lens configured to enlarge said object beam.

3. The system according to claim 1, wherein said interferometric arrangement further comprises at least one mirror configured to deflect the object beam before it irradiates at least a portion of said object, said at least one mirror being movable so as to adjust a direction of said object beam before it irradiates at least a portion of said object.

4. The system according to claim 1, wherein said interferometric arrangement further comprises an optical attenuator configured to adjust an optical power of said reference beam so that, on the surface of said infrared detector, the optical power of said reference beam substantially equals the optical power of the object beam scattered by the object.

5. The system according to claim 1, wherein said processor is configured to:
filter said hologram so as to cancel a zero diffraction order;
carry out a zero-padding operation on said hologram; and
perform a numerical focusing of said hologram.

6. The system according to claim 1, wherein said infrared detector is configured to detect a sequence of holograms of the object.

7. The system according to claim 6, wherein said processor is configured to numerically process each hologram of the sequence of holograms to reconstruct a sequence of images of said object, and to display said sequence of images of said object in a form of a video.

8. The system according to claim 6, wherein said processor is configured to:
select K holograms from said sequence of holograms, K being an integer number equal to or higher than 2;
process each one of the K holograms to reconstruct K images of said object; and
combine said K images into a multi-look image of said object.

9. The system according to claim 8, wherein said processor is configured to select said K holograms by decimating said sequence of holograms, said decimating being carried out so that said K holograms are equispaced in time, wherein the time interval between two consecutive holograms of said K holograms is long enough to ensure that the flame induces an uncorrelation between them.

10. The system according to claim 1, wherein the infrared radiation emitted from the laser source has a wavelength between 8 μm and 12 μm.

11. A method for reconstruction an image of an object at least partially hidden by a flame, said method comprising:
a) providing a coherent infrared radiation having a wavelength between 3 μm and 1 mm;
b) dividing said infrared radiation into an object beam and a reference beam, irradiating at least a portion of said object at least partially hidden by a flame by said object beam so that said object beam is scattered by said object and inducing said reference beam to interfere with scattered object beam on the surface of an infrared detector, so as to detect a hologram of said object; and
c) reconstructing said image of said object at least partially hidden by the flame by numerically processing said hologram.

12. The method according to claim 11, wherein step b) comprises enlarging the object beam before it irradiates at least a portion of said object and enlarging said reference beam before it irradiates said surface of said infrared detector.

13. The method according to claim 11, wherein step b) further comprises adjusting a direction of said object beam before it irradiates at least a portion of said object.

14. The method according to claim 11, wherein step b) further comprises adjusting an optical power of said reference beam so that, on the surface of said infrared detector, the optical power of said reference beam substantially equals the optical power of the object beam scattered by said object.

15. The method according to claim 11, wherein step c) comprises:
filtering said hologram so as to cancel a zero diffraction order;

carrying out a zero-padding operation on said hologram; and performing a numerical focusing of said hologram.

16. The method according to claim 11, wherein step b) comprises detecting a sequence of holograms of the object.

17. The method according to claim 16, wherein step c) comprises numerically processing each hologram of the sequence of holograms to reconstruct a sequence of images of said object, and displaying said sequence of images of said object in the form of a video.

18. The method according to claim 16, wherein step c) comprises selecting K holograms from said sequence of holograms, K being an integer number equal to or higher than 2, processing each one of the K holograms thereby reconstructing K images of said object, and combining said K images into a multi-look image of said object.

19. The method according to claim 18, wherein said selecting said K holograms comprises decimating said sequence of holograms, said decimating being carried out so that said K holograms are equispaced in time, wherein the time interval between two consecutive holograms of said K holograms is long enough to ensure that the flame induces an uncorrelation between them.

20. The method according to claim 11, wherein the infrared radiation has a wavelength between 8 μm and 12 μm.

* * * * *

UNITED STATES PATENT AND TRADEMARK OFFICE
CERTIFICATE OF CORRECTION

| | | |
|---|---|---|
| PATENT NO. | : 9,310,767 B2 | Page 1 of 1 |
| APPLICATION NO. | : 14/100775 | |
| DATED | : April 12, 2016 | |
| INVENTOR(S) | : Pietro Ferraro et al. | |

It is certified that error appears in the above-identified patent and that said Letters Patent is hereby corrected as shown below:

On the title page, Item (73), the Assignee's Information is incorrect. Item (73) should read:

--(73) Assignee: CONSIGLIO NAZIONALE DELLE RICERCHE-CNR, Rome (IT)--

Signed and Sealed this
Fifth Day of July, 2016

Michelle K. Lee
*Director of the United States Patent and Trademark Office*